(12) United States Patent
Fujita et al.

(10) Patent No.: US 11,347,007 B2
(45) Date of Patent: May 31, 2022

(54) OPTICAL CONNECTOR

(71) Applicant: FUJIKURA LTD., Tokyo (JP)

(72) Inventors: Shunsuke Fujita, Chiba (JP); Takahito Otomitsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 11 days.

(21) Appl. No.: 17/259,771

(22) PCT Filed: Jun. 25, 2019

(86) PCT No.: PCT/JP2019/025082
§ 371 (c)(1),
(2) Date: Jan. 12, 2021

(87) PCT Pub. No.: WO2020/017254
PCT Pub. Date: Jan. 23, 2020

(65) Prior Publication Data
US 2021/0341680 A1     Nov. 4, 2021

(30) Foreign Application Priority Data
Jul. 19, 2018   (JP) .............................. JP2018-135647

(51) Int. Cl.
*G02B 6/38*          (2006.01)
(52) U.S. Cl.
CPC ......... *G02B 6/3821* (2013.01); *G02B 6/3825* (2013.01); *G02B 6/3869* (2013.01); *G02B 6/3885* (2013.01); *G02B 6/3893* (2013.01); *G02B 6/3897* (2013.01)

(58) Field of Classification Search
CPC ..................................................... G02B 6/3821
See application file for complete search history.

(56) References Cited

U.S. PATENT DOCUMENTS

| 2014/0348469 | A1 | 11/2014 | Zimmel et al. |
| 2015/0355417 | A1 | 12/2015 | Takano et al. |
| 2017/0090126 | A1 | 3/2017 | Lu |
| 2017/0160496 | A1* | 6/2017 | de Jong ............... G02B 6/3825 |

FOREIGN PATENT DOCUMENTS

| CN | 103026277 A | 4/2013 |
| CN | 103460096 A | 12/2013 |
| CN | 103984060 A | 8/2014 |
| CN | 104094146 A | 10/2014 |

(Continued)

*Primary Examiner* — Sung H Pak
(74) *Attorney, Agent, or Firm* — Osha Bergman Watanabe & Burton LLP

(57) ABSTRACT

An optical connector includes: a ferrule; a housing that houses a floating mechanism that retractably presses the ferrule; a coupling attached to an outside of the housing; and a boot attached to a rear side of a spring push of the floating mechanism. The spring push includes: a tube part; a flange section formed on an outer circumference of the tube part; a groove part formed closer to a front side of the tube part than the flange section; and a projection that protrudes outward from a portion of an outer surface of the groove part. The boot includes: a claw part that is formed on a front edge of a front opening of the boot and that hooks onto the groove part; and a recess that is formed in the front edge of the front opening of the boot and that engages with the projection.

3 Claims, 6 Drawing Sheets

(56) References Cited

FOREIGN PATENT DOCUMENTS

| | | |
|---|---|---|
| JP | H10-096834 A | 4/1998 |
| JP | 2004-102072 A | 4/2004 |
| JP | 2011-027856 A | 2/2011 |
| JP | 2013-246321 A | 12/2013 |
| JP | 2015-184359 A | 10/2015 |

* cited by examiner

OPTICAL CONNECTOR

TECHNICAL FIELD

The present invention relates to an optical connector.

BACKGROUND

As an example of an optical connector, for example, an MPO connector (F13-type multicore optical fiber connector stipulated in JIS C5982) has been known. The optical connector includes a ferrule, a housing, and a boot. The housing houses, together with the ferrule, a floating mechanism for retractably pressing the ferrule. Further, a coupling is attached to the outside of the housing. The coupling is a member that releases a latch of the optical connector. By pulling the coupling to a rear side, the latch of the optical connector is released (when the optical connector is removed, the coupling is pulled to the rear side). The boot is disposed on the rear side of the housing.

Patent Literature 1 describes such an optical connector (MPO optical connector).

PATENT LITERATURE

Patent Literature 1: JP 2013-246321A

The boot is formed of a relatively flexible material. Thus, when a rotary force is applied to the boot, the boot may be deformed, and the boot may rotate with respect to the housing.

Meanwhile, shortening of the housing has been considered in order to shorten the optical connector. However, when the housing is shortened, positions of the coupling and the boot in a front-rear direction result in being closer to each other.

Then, when the boot is shifted with respect to the housing in a rotational direction under a circumstance where the housing is shortened, there is a possibility that the boot and the coupling interfere with each other and the coupling is thus prevented to be pulled to the rear side (described later).

SUMMARY

One or more embodiments of the present invention provides a boot that is less likely to be shifted with respect to a housing in a rotational direction even when a rotary force is applied to the boot.

One or more embodiments of the present invention is an optical connector comprising: a ferrule; a housing that houses a floating mechanism for retractably pressing the ferrule; a coupling attached to an outside of the housing; and a boot attached to a rear side of a spring push of the floating mechanism, wherein the spring push includes a tube part, a flange section formed on an outer circumference of the tube part, a groove part formed closer to a front side than the flange section, and a projection that protrudes outward from a portion of an outer surface of the groove part, and the boot includes a claw part that is formed on a front edge of a front opening of the boot and that is to be hooked on the groove part, and a recess that is formed in the front edge of the front opening of the boot and that is to be engaged with the projection.

Other features of the invention are made clear by the following description and the drawings.

With the present invention, a shift of a boot with respect to a housing in a rotational direction can be suppressed.

DETAILED DESCRIPTION

At least the following matters are made clear from the following description and the drawings.

An optical connector will become clear comprising: a ferrule; a housing that houses a floating mechanism for retractably pressing the ferrule; a coupling attached to an outside of the housing; and a boot attached to a rear side of a spring push of the floating mechanism, wherein the spring push includes a tube part, a flange section formed on an outer circumference of the tube part, a groove part formed closer to a front side than the flange section, and a projection that protrudes outward from a portion of an outer surface of the groove part, and the boot includes a claw part that is formed on a front edge of a front opening of the boot and that is to be hooked on the groove part, and a recess that is formed in the front edge of the front opening of the boot and that is to be engaged with the projection. With such an optical connector, the projection of the spring push and the recess of the boot engage with each other, and thus a shift of the boot with respect to the housing in a rotational direction can be suppressed.

In one or more embodiments, the spring push includes a pair of notch parts disposed to sandwich the projection from both sides, and the boot includes a pair of boot-side projections that engage with the notch parts. In this way, a shift of the boot with respect to the housing in the rotational direction can be further suppressed.

In one or more embodiments, the housing includes a pair of protrusions that protrude to the rear side, the pair of protrusions is disposed to outside of a pair of the projections, and a front edge part of the boot is disposed between the protrusions and the projections. In this way, a shift of the boot with respect to the housing in the rotational direction can be further suppressed.

<Basic Configuration>

Figure 1A:
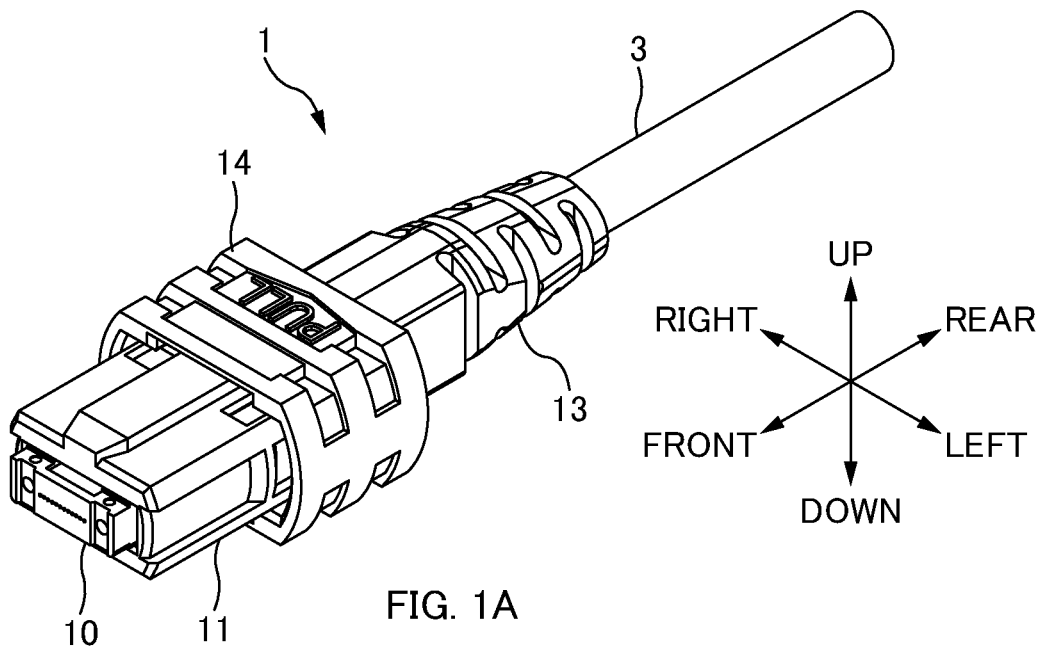
FIG. 1A is a general perspective view of an optical connector 1 according to one or more embodiments.
Figure 1B:
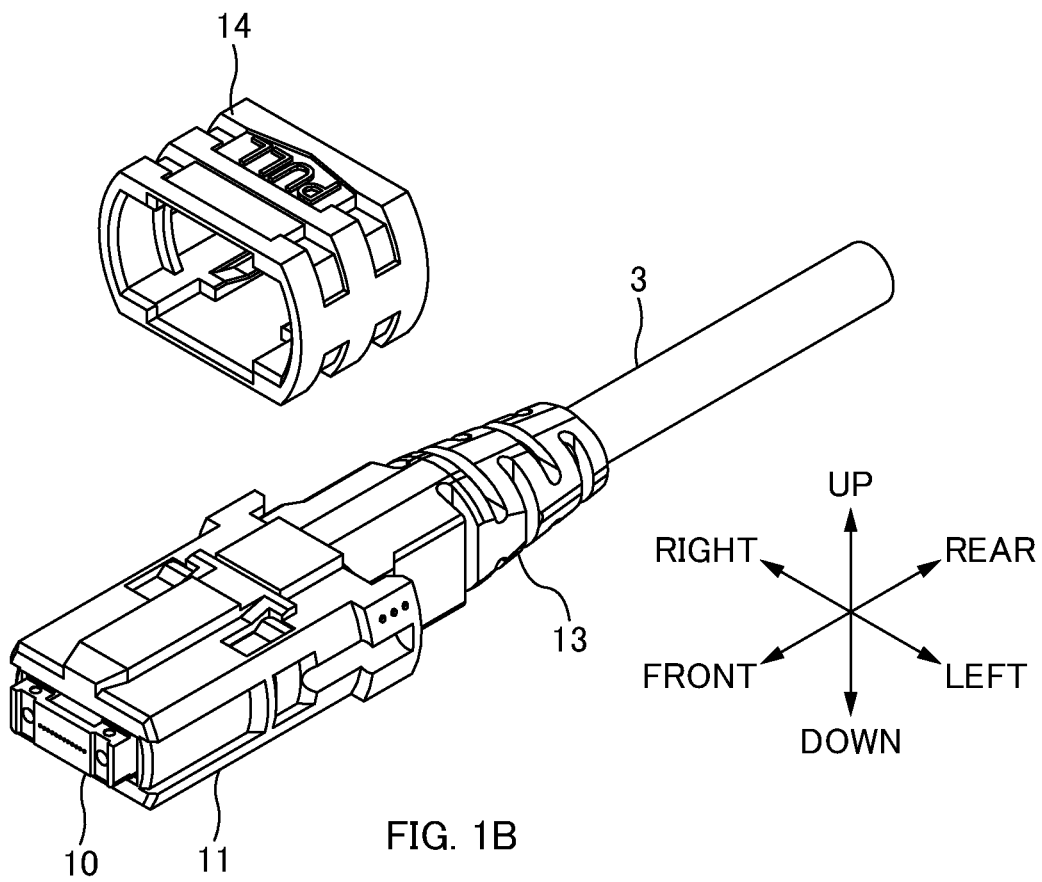
FIG. 1B is a perspective view of the optical connector 1 in a state where a coupling 14 is removed.
Figure 2:
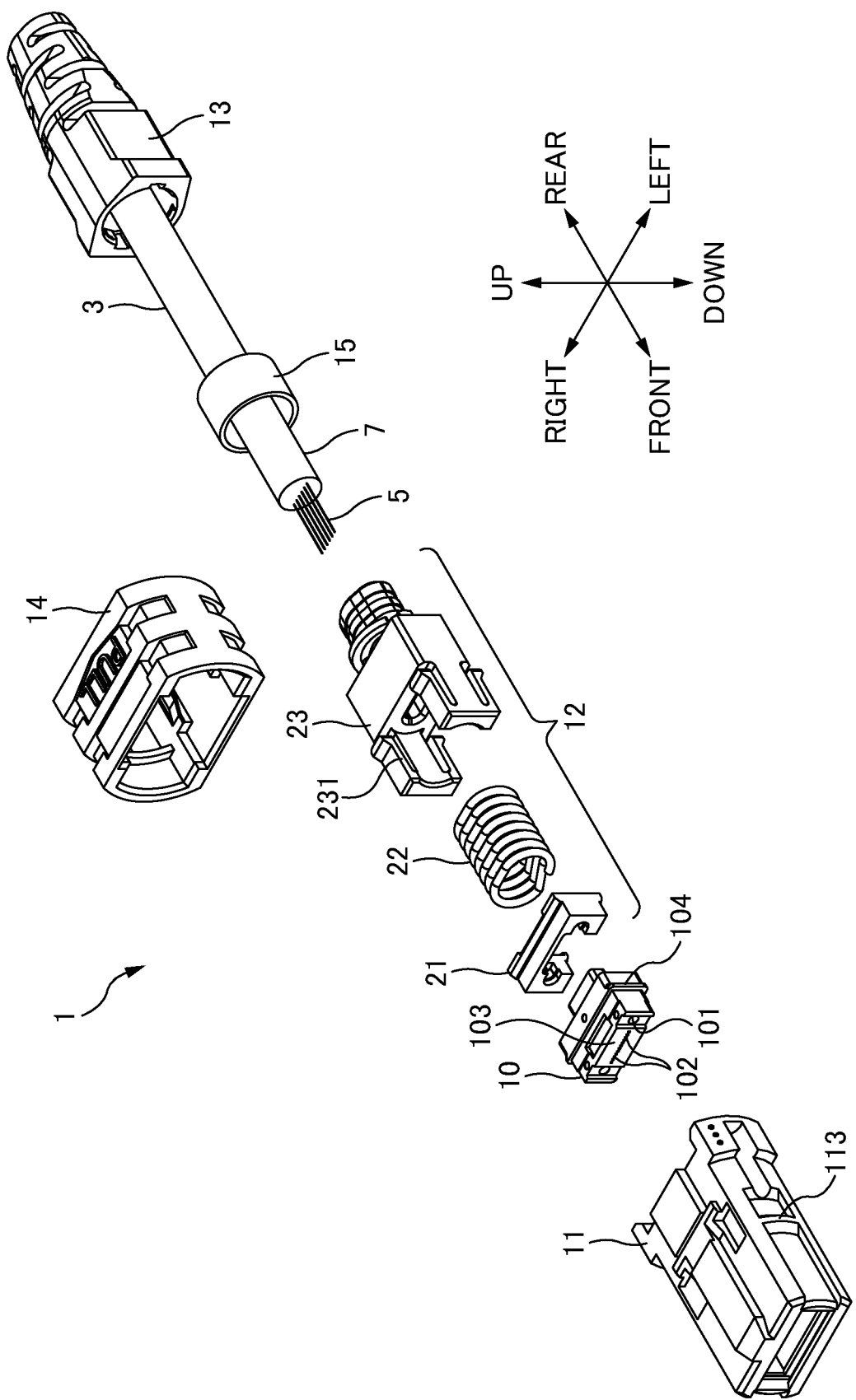
FIG. 2 is an exploded view of the optical connector 1.

FIG. 1A is a general perspective view of an optical connector 1 according to one or more embodiments, and FIG. 1B is a perspective view of the optical connector 1 in a state where a coupling 14 is removed. FIG. 2 is an exploded view of the optical connector 1.

In the following description, directions will be defined as illustrated in the drawings. Specifically, a longitudinal direction (optical axis direction) of an optical cord 3 is a "front-rear direction", a side (tip side of optical fibers 5) on which a housing 11 is provided with respect to a boot 13 is "front", and an opposite side thereof is "rear". Further, a direction in which a pair of guide pin holes 101 are aligned and a direction in which a plurality of optical fiber holes 102 are aligned are a "left-right direction", a right side when a front side is seen from a rear side is "right", and an opposite side is "left". Note that the left-right direction may also be referred to as a "width direction". Further, a direction orthogonal to the "front-rear direction" and the "left-right direction (width direction)" is an "up-down direction", and "up" and "down" are defined as illustrated in the drawings.

The optical connector 1 according to one or more embodiments is an MPO connector (stipulated in JIS C 5982, IEC 61754-7, and the like). The optical connector 1 includes a ferrule 10, the housing 11, a floating mechanism 12, the boot 13, the coupling 14, a caulking member 15, and the optical cord 3.

The ferrule 10 is a member that holds ends of the optical fibers 5. The ferrule 10 includes the pair of guide pin holes 101, the plurality of optical fiber holes 102, a connecting end face 103, and a flange part 104.

Each of the guide pin holes 101 is a hole for insertion of a guide pin (not illustrated). When the optical connector 1 is a male type, the guide pin is inserted in advance through the guide pin hole 101 such that an end of the guide pin protrudes from the guide pin hole 101. When the optical connector 1 is a female type, a guide pin of an optical connector on the other side is inserted through the guide pin hole 101. The guide pin fits in the guide pin hole 101 during a connector connection, and thus alignment of the ferrule 10 is performed.

Each of the optical fiber holes 102 is a hole for insertion of the end of a corresponding one of the optical fibers 5. The end of the optical fiber 5 is fixed in the corresponding optical fiber hole 102.

The connecting end face 103 is an end face for connection with a ferrule and the like of the optical connector on the other side. The connecting end face 103 is provided on a front side of the ferrule 10. Openings of the pair of guide pin holes 101 and the plurality of optical fiber holes 102 are formed in the connecting end face 103.

The flange part 104 is a section that protrudes outward from an outer surface of the ferrule 10.

The housing 11 is a tubular member that houses the ferrule 10 while retractably pressing the ferrule 10. A protrusion (not illustrated) protruding inward is provided on an inner wall surface of the housing 11. The protrusion contacts the flange part 104 of the ferrule 10, and thus the ferrule 10 pressed forward is prevented from coming out from the front. Further, an anchor section 113 on which a claw part (not illustrated) of an adapter is to be hooked is formed on a side surface of the housing 11. Note that the housing 11 according to one or more embodiments is shortened and has a short length in the front-rear direction (the optical connector according to one or more embodiments may be referred to as a short MPO or a mini MPO).

The floating mechanism 12 is a section that presses the ferrule 10 forward, and is housed in the housing 11. The floating mechanism 12 includes a pin clamp 21, a spring 22, and a spring push 23.

The pin clamp 21 clamps and holds the guide pins (not illustrated). The pin clamp 21 is a member disposed to the rear of the ferrule 10. When the optical connector 1 is a male type, the pin clamp 21 holds rear ends of the guide pins (not illustrated). Note that flanges (not illustrated) of the guide pins are sandwiched and disposed between a rear endface of the ferrule 10 and a front endface of the pin clamp 21, to prevent the guide pins from coming out in the front-rear direction. Note that the guide pins extend through the respective guide pin holes 101 of the ferrule 10, and tips of the guide pins protrude from the connecting end face 103. A front end of the spring 22 is fixed to a rear part of the pin clamp 21.

The spring 22 is an elastic member that applies pressure for pressing the ferrule 10 forward. The spring 22 is housed in the housing 11 while being compressed and deformed between the pin clamp 21 and the spring push 23. The front end of the spring 22 is fixed to the pin clamp 21, and a rear end of the spring 22 is fixed to the spring push 23. Further, the spring 22 is disposed so as to be sandwiched between a pair of arm parts 231 of the spring push 23. The spring 22 according to one or more embodiments has a length in the left-right direction (width direction) greater than a length in the up-down direction. In other words, the spring 22 is formed so as to have an elliptical shape having a long diameter in the left-right direction and a short diameter in the up-down direction when seen from the front-rear direction. However, a shape (shape seen from the front-rear direction) of the spring 22 is not limited to an elliptical shape. For example, the spring 22 may be formed in a round shape.

The spring push 23 is a member that houses the spring 22 in a compressed state in the housing 11. The spring push 23 is hooked on the housing 11, and thus the spring 22 in a compressed state is housed in the housing 11. In this way, the ferrule 10 is pressed forward via the pin clamp 21 by a repulsive force of the compressed and deformed spring 22. By pressing the ferrule 10 in such a manner, when the optical connectors 1 are connected to each other, a state where endfaces of the ferrules 10 physically abut on each other with a predetermined force can be held. Note that details of a coupling part (front-side coupling part) of the spring push 23 for coupling to the boot 13 will be described later.

The boot 13 is a member for making a curve of the optical fibers 5 gentle, and is attached to the rear side of the housing 11 (specifically, the rear side of the spring push 23 of the floating mechanism 12 housed in the housing 11). In one or more embodiments, the boot 13 is formed of a material having flexibility such as rubber or an elastomer, for example, but may be formed of a material having low flexibility such as resin or metal. The boot 13 reduces a transmission loss of light or protects the optical fibers themselves. Note that details of a coupling part (boot-side coupling part) of the boot 13 for coupling to the spring push 23 will be described later.

The coupling 14 is a tubular member disposed outside the housing 11, and is provided to be slidable in the front-rear direction with respect to the housing 11. The coupling 14 is a coupling member that holds a state (hereinafter, referred to as a latch state) where the claw part (not illustrated) of the adapter is hooked on the anchor section 113 of the housing 11. Specifically, in the state (latch state) where the claw part (not illustrated) of the adapter is hooked on the anchor section 113 of the housing 11, an inner wall surface of the coupling 14 prevents the claw part (not illustrated) of the adapter from opening outward, and thus the latch state is held. For removing the optical connector 1, when the coupling 14 slides to the rear side with respect to the housing 11, the claw part (not illustrated) of the adapter is allowed to open outward, and the latch state is released.

The optical cord 3 includes the optical fibers 5 and a sheath 7.

Each of the optical fibers 5 is a transmission line of an optical signal, and a plurality of optical fibers 5 are provided in the optical cord 3. The plurality of optical fibers 5 may be formed in a form of optical fibers of an intermittently fixed-type optical fiber ribbon. In this way, the optical fibers of the optical fiber ribbon can be rolled up into a tube shape (bundle shape) and folded, and a large number of the optical fibers 5 can be bundled at high density.

The sheath 7 is a sheath material that covers the plurality of optical fibers 5, and is formed of a thermoplastic resin and the like. Then, ends of the optical fibers 5 (bare optical fibers) from which the sheath 7 and the like are removed are inserted into the optical fiber holes 102 of the ferrule 10.

The caulking member 15 is a ring-shaped member made of metal, and is a member for fixing (caulk-fixing) an end (lead part) of the sheath 7 of the optical cord 3 to a tube part 23A of the spring push 23.

Figure 3A:
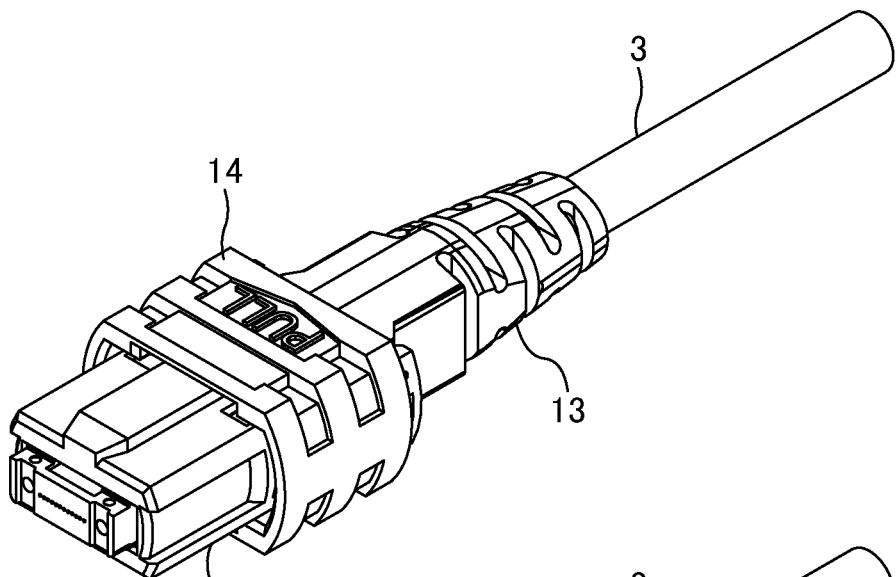
FIG. 3A is a perspective view illustrating a state of the optical connector 1 at a normal time.
Figure 3B:
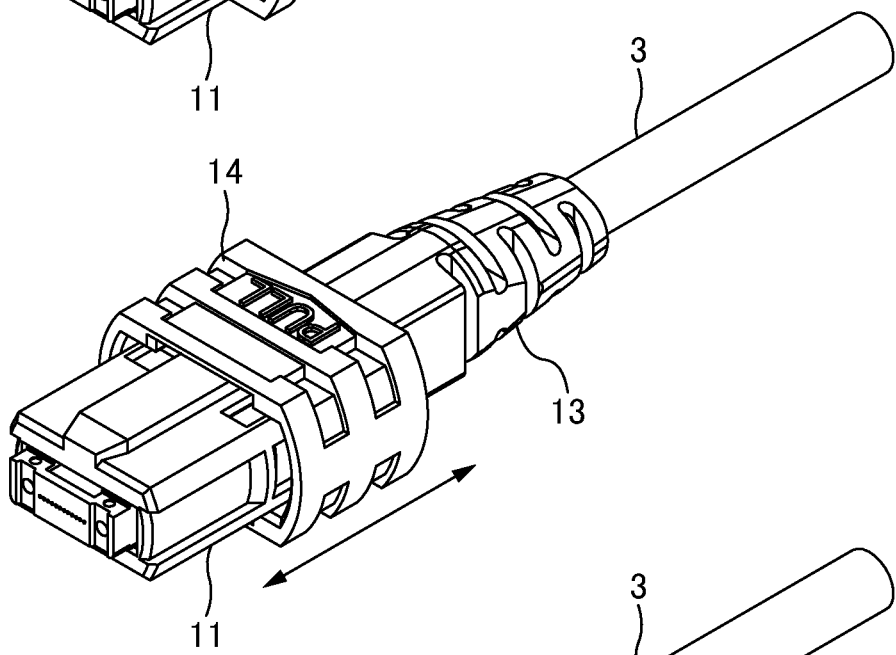
FIG. 3B is a perspective view at the time of removal of the optical connector 1 (in a state where the coupling 14 is slid to a rear side).
Figure 3C:
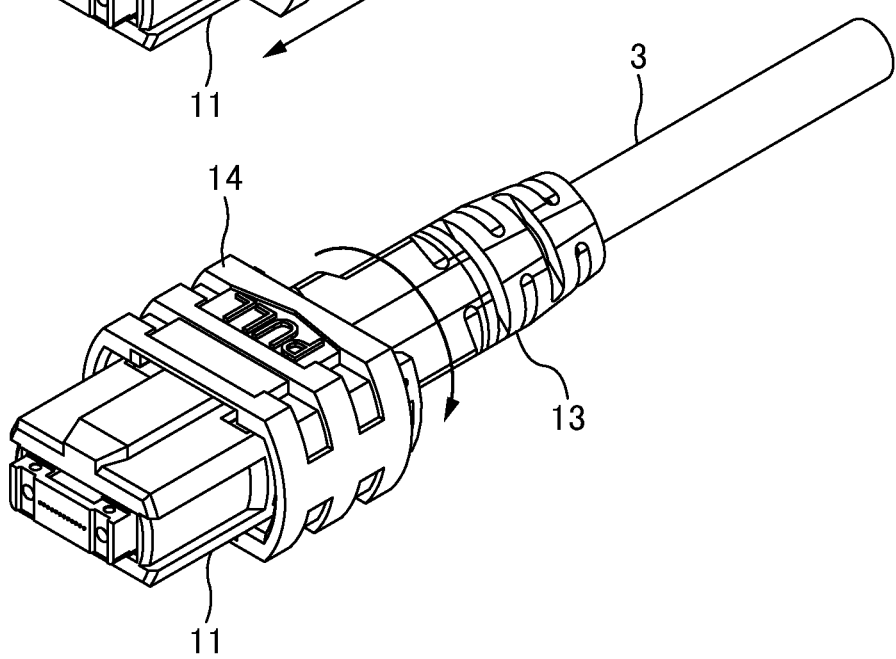
FIG. 3C is a perspective view when a boot 13 is shifted with respect to a housing 11 in a rotational direction.

FIG. 3A is a perspective view illustrating a state of the optical connector 1 at a normal time. FIG. 3B is a perspective view at the time of removal of the optical connector 1 (in a state where the coupling 14 is slid to a rear side). FIG. 3C is a perspective view when the boot 13 is shifted with respect to the housing 11 in a rotational direction. Note that the rotational direction is a direction of rotating in a clockwise direction or a counterclockwise direction about the optical cord 3 as an axis (center).

In the optical connector 1 according to one or more embodiments, the housing 11 is shortened as described above. Thus, as illustrated in FIG. 3A, positions of the coupling 14 and the boot 13 in the front-rear direction are close to each other.

In the optical connector 1, as illustrated in FIG. 3B, the coupling 14 is movable in the front-rear direction with respect to the housing 11, and, as described above, the latch state can be released by sliding the coupling 14 to the rear side with respect to the housing 11.

Since the boot 13 is formed of a relatively flexible material, as illustrated in FIG. 3C, the boot 13 may rotate with respect to the housing 11 when a rotary force is applied to the boot 13.

In such a manner, when the boot 13 is shifted with respect to the housing 11 in the rotational direction under a circumstance where the housing 11 is shortened, there is a possibility that the boot 13 and the coupling 14 interfere with each other and sliding of the coupling 14 to the rear side is thus prevented. In other words, releasing of the latch state may be prevented.

Thus, in one or more embodiments, a coupling part between the spring push 23 and the boot 13 (hereinafter, also simply referred to as a coupling part) is configured such that the boot 13 is less likely to be shifted with respect to the housing 11 in the rotational direction.

<Coupling Part>

Figure 4A:
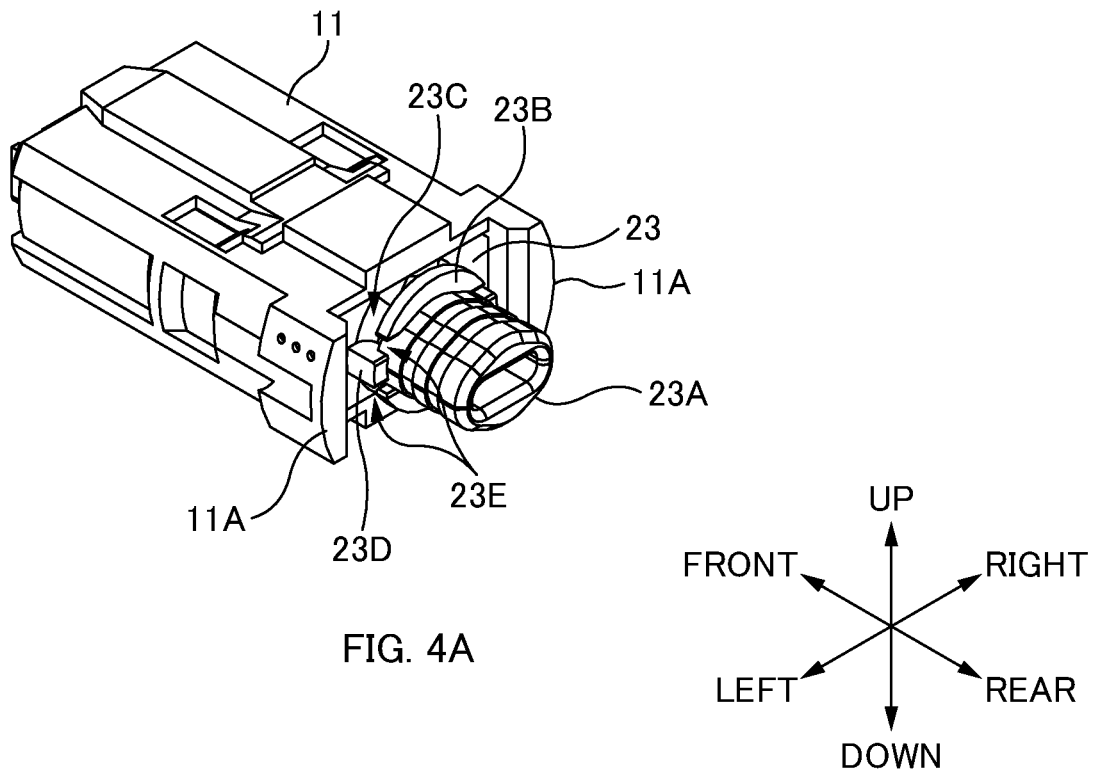
FIG. 4A is a perspective view of a front-side coupling part.
Figure 4B:
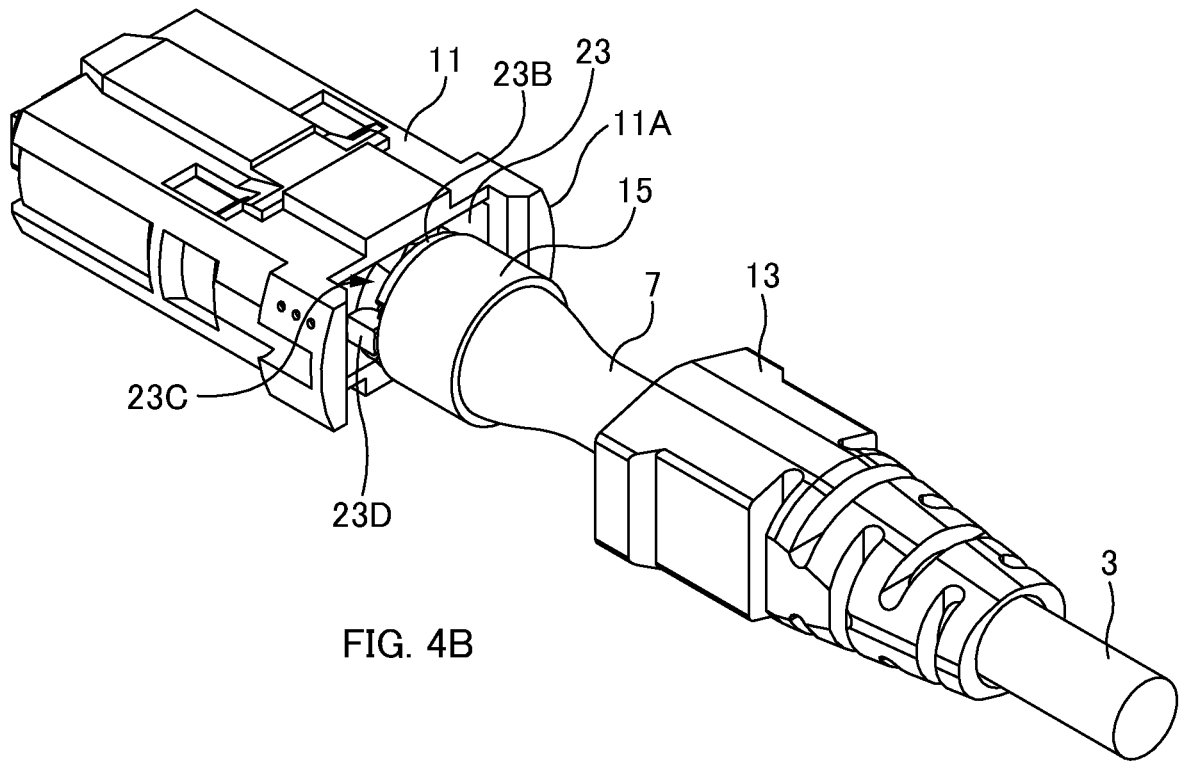
FIG. 4B is a diagram illustrating a state where a caulking member 15 is aligned with a flange section 23B.
Figure 5:
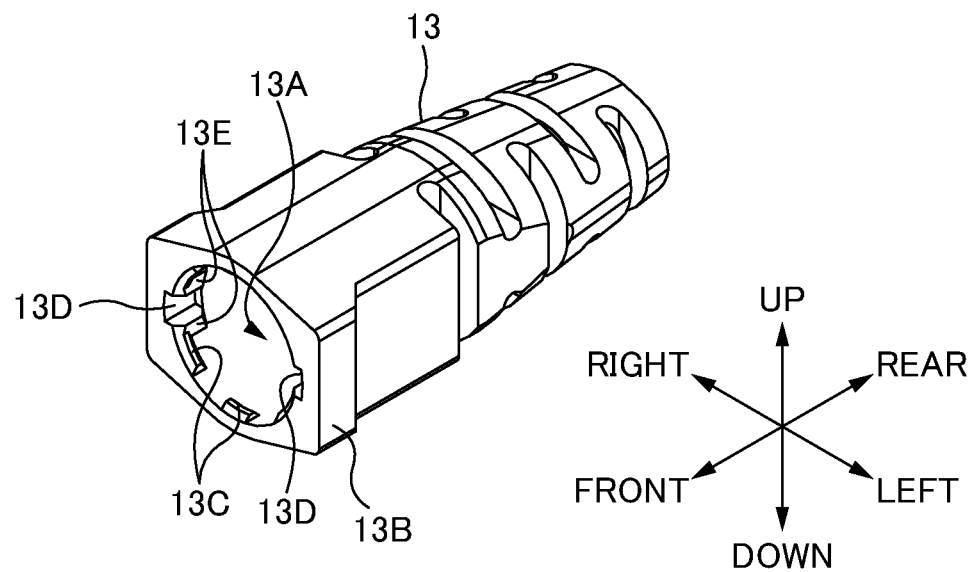
FIG. 5 is a perspective view of a boot-side coupling part.
Figure 6:
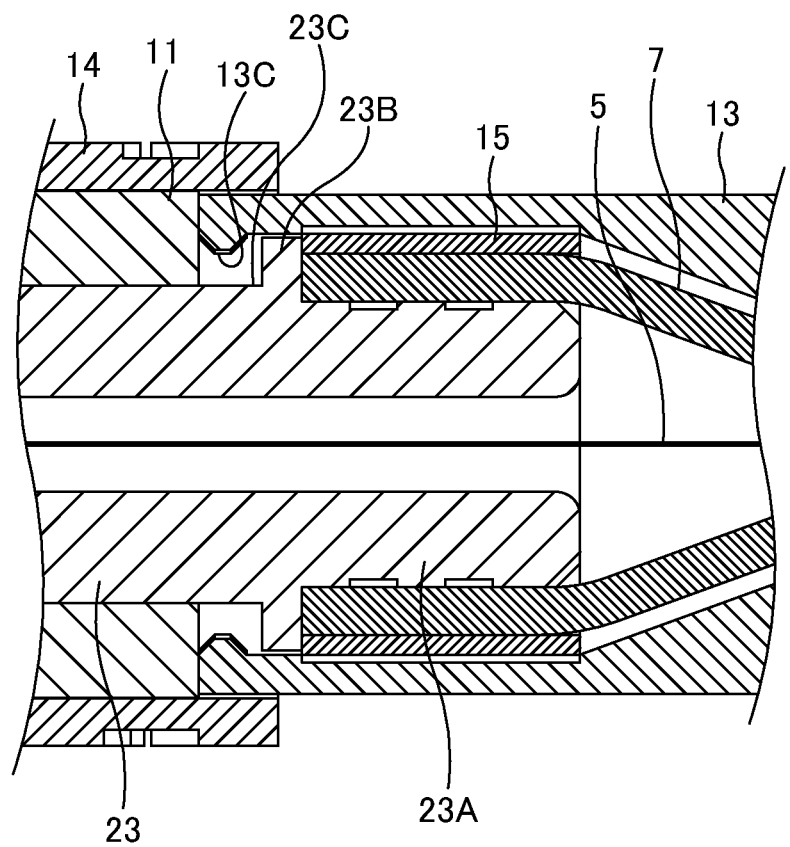
FIG. 6 is a cross-sectional view of a coupling part.

FIG. 4A is a perspective view of the front-side coupling part, and FIG. 4B is a diagram illustrating a state where the caulking member 15 is aligned with a flange section 23B. FIG. 5 is a perspective view of the boot-side coupling part. FIG. 6 is a cross-sectional view of the coupling part.

Front-Side Coupling Part

The front-side coupling part is a section of the coupling part on the front side, and is constituted by the spring push 23 and a rear end of the housing 11, as illustrated in FIG. 4A.

(Spring Push 23)

The spring push 23 includes, as the front-side coupling part, the tube part 23A, the flange section 23B, a groove part 23C, a projection 23D, and notch parts 23E.

The tube part 23A is a tubular section that protrudes from a rear endface of the spring push 23 to the rear side. The plurality of optical fibers 5 of the optical cord 3 are inserted into the tube part 23A. The sheath 7 of the optical cord 3 covers the outside of the tube part 23A. Furthermore, the caulking member 15 is disposed outside the sheath 7. Then, the sheath 7 is fixed (caulk-fixed) to the tube part 23A by caulking the caulking member 15.

The flange section 23B is a section formed on an outer circumference of the tube part 23A so as to protrude outward. When the caulking member 15 is fit to the outside of the tube part 23A, as illustrated in FIG. 4B, the caulking member 15 abuts on the flange section 23B. In this way, alignment of the caulking member 15 can be performed (i.e., the caulking member 15 can be prevented from being excessively inserted).

The groove part 23C is a groove-shaped section formed in the tube part 23A closer to the front side than the flange section 23B, and is a section on which a claw part 13C of the boot 13 is hooked (cf. FIG. 6).

The projection 23D protrudes outward from a portion of an outer surface of the groove part 23C. In one or more embodiments, the projection 23D is provided in pair on both left and right sides of the tube part 23A. The projection 23D is a section that engages with a recess 13D (described later) of the boot 13.

The notch parts 23E are sections engaged with boot-side projections 13E (described later) of the boot 13. In one or more embodiments, a pair of notch parts 23E are disposed so as to sandwich the projection 23D from both sides in the up-down direction (e.g., on opposing sides of the projection in a rotational direction). In other words, the notch parts 23E are disposed on both up and down sides (both sides in the rotational direction) of the projection 23D.

(Housing 11)

The housing 11 includes protrusions 11A as the front-side coupling part. The protrusions 11A are sections that protrude from the housing 11 to the rear side, and are disposed on the outside in the left-right direction with respect to the pair of projections 23D of the spring push 23. Then, when the boot 13 is attached, the protrusions 11A press a front edge (front edge part 13B) of the boot 13 from the outside in the left-right direction. In other words, the protrusions 11A each press an engagement section between the corresponding projection 23D of the spring push 23 and the corresponding recess 13D of the boot 13 from the outside. In this way, the engagement of the boot 13 is less likely to be disengaged, and a shift of the boot 13 with respect to the housing 11 in the rotational direction can be suppressed.

Boot-Side Coupling Part

The boot-side coupling part is a section of the coupling part on the rear side (boot 13 side), and is constituted by a front-side portion of the boot 13, as illustrated in FIG. 5. The boot 13 includes, as the boot-side coupling part, a front opening 13A, the front edge part 13B, the claw part 13C, the recess 13D, and the boot-side projections 13E.

The front opening 13A is an opening that opens on the front side of the boot 13, and is a section into which the tube part 23A (and the caulking member 15) of the spring push 23 is inserted.

The front edge part 13B is a section of the front edge part of the boot 13 that is engaged between the projection 23D of the spring push 23 and the protrusion 11A of the housing 11, and is provided on an end (side part) on each of both sides in the left-right direction. The front edge part 13B is engaged (is disposed) between the projection 23D of the spring push 23 and the protrusion 11A of the housing 11, and thus an effect of suppressing misalignment of the boot 13 in the rotational direction can be increased.

The claw part 13C is formed on a front edge of the front opening 13A, and protrudes inside the front opening 13A. The claw part 13C is a section that is to be coupled to (hooked on) the groove part 23C of the spring push 23 (cf.

FIG. 6). The coupling between the claw part 13C and the groove part 23C can prevent misalignment of the boot 13 with respect to the spring push 23 (i.e., the housing 11) in the front-rear direction. Note that, when the claw part 13C is coupled to the groove part 23C, the boot 13 is deformed such that the claw part 13C expands outward further than the flange section 23B. The boot 13 is formed of a relatively flexible material to the extent that such deformation is allowed.

The recess 13D is formed in the front edge of the front opening 13A. The recess 13D is a section that is to be engaged with the projection 23D of the spring push 23, and is provided in pair (in pair at both ends of the front opening 13A in the left-right direction) corresponding to the projections 23D. When the boot 13 is attached to the housing 11 (spring push 23), the projection 23D of the spring push 23 and the recess 13D of the boot 13 engage with each other. The engagement can suppress misalignment of the boot 13 with respect to the spring push 23 (i.e., the housing 11) in the rotational direction.

The boot-side projections 13E are sections that engage with the notch parts 23E of the spring push 23 disposed in the housing 11. As illustrated in FIG. 5, a pair of boot-side projections 13E are disposed so as to sandwich the recess 13D in the up-down direction (rotational direction). In other words, the boot-side projections 13E are disposed on both up and down sides (both sides in the rotational direction) of the recess 13D. When the boot 13 is attached to the spring push 23, the boot-side projections 13E engage with the notch parts 23E. The engagement can further suppress misalignment of the boot 13 with respect to the spring push 23 (i.e., the housing 11) in the rotational direction. Note that the notch parts 23E of the spring push 23 and the boot-side projections 13E of the boot 13 may not be provided. Even in this case, as long as the projection 23D of the spring push 23 and the recess 13D of the boot 13 engage with each other, misalignment of the boot 13 with respect to the housing 11 in the rotational direction can be suppressed. However, in one or more embodiments, a configuration including not only the projection 23D and the recess 13D but also including the notch parts 23E and the boot-side projections 13 can further suppress misalignment of the boot 13 with respect to the housing 11 in the rotational direction.

As described above, the optical connector 1 according to one or more embodiments includes the ferrule 10, the housing that houses the floating mechanism 12 for retractably pressing the ferrule 10, the coupling 14 attached to the outside of the housing, and the boot 13 attached to the rear side of the spring push 23 of the floating mechanism 12.

The spring push 23 includes the tube part 23A, the flange section 23B formed on the outer circumference of the tube part 23A, the groove part 23C formed closer to the front side than the flange section 23B, and the projection 23D that protrudes outward from a portion of the outer surface of the groove part 23C.

Meanwhile, the boot 13 includes the claw part 13C that is formed on the front edge of the front opening 13A of the boot and that is to be hooked on the groove part 23C of the spring push 23, and the recess 13E that is formed in the front edge of the front opening 13A and that is to be engaged with the projection 23D of the spring push 23.

With the configuration above, when the boot 13 is attached to the housing 11 (spring push 23), the projection 23D of the spring push 23 and the recess 13D of the boot 13 engage with each other. The engagement can suppress a shift of the boot 13 with respect to the spring push 23 (i.e., the housing 11) in the rotational direction.

The spring push 23 includes the pair of notch parts 23E disposed to sandwich the projection 23D from both up and down sides (in the rotational direction), and the boot 13 includes the pair of boot-side projections 13E that engage with the notch parts 23E. In this way, when the boot 13 is attached to the housing 11, the pair of boot-side projections 13E and the pair of notch parts 23E engage with each other, and thus a shift of the boot 13 with respect to the housing 11 in the rotational direction can be further suppressed.

The housing 11 includes the pair of protrusions 11A that protrude to the rear side, and the pair of protrusions 11A is disposed outside the projections 23D of the spring push. When the boot 13 is attached to the housing 11, the front edge part 13B of the boot 13 is disposed between the protrusions 11A and the projections 23D. In this way, a shift of the boot 13 with respect to the housing 11 in the rotational direction can be further suppressed. Note that the housing 11 may not include the pair of protrusions 11A. Even in this case, as long as the projection 23D of the spring push 23 and the recess 13D of the boot 13 are engaged with each other, misalignment of the boot 13 with respect to the housing 11 in the rotational direction can be suppressed. However, in one or more embodiments, the housing 11 is provided with the pair of protrusions 11A and to dispose the front edge part 13B of the boot 13 between the protrusions 11A and the projections 23D, because misalignment of the boot 13 with respect to the housing 11 in the rotational direction can be further suppressed.

Other Embodiments

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical connector;
3: Optical cord;
5: Optical fiber;
7: Sheath;
10: Ferrule;
11: Housing;
12: Floating mechanism;
13: Boot;
13B: Front edge part;
13C: Claw part;
13D: Recess;
13E: Boot-side projection;
14: Coupling;
15: Caulking member;
21: Pin clamp;
22: Spring;
23: Spring push;
23A: Tube part;
23B: Flange section;
23C: Groove part;
23D: Projection;
23E: Notch part;
101: Guide pin hole;
102: Optical fiber hole;
103: Connecting end face;
104: Flange part;
231: Arm part.

The invention claimed is:
1. An optical connector comprising:
a ferrule;
a housing that houses a floating mechanism that retractably presses the ferrule;

a coupling attached to an outside of the housing; and
a boot attached to a rear side of a spring push of the floating mechanism, wherein
the spring push includes:
  a tube part;
  a flange section on an outer circumference of the tube part;
  a groove part closer to a front side of the tube part than the flange section; and
  a projection that protrudes outward from a portion of an outer surface of the groove part, and
the boot includes:
  a claw part on a front edge of a front opening of the boot, wherein the claw part hooks onto the groove part; and
  a recess in the front edge of the front opening of the boot, wherein the recess engages with the projection.

2. The optical connector according to claim 1, wherein
the spring push includes a pair of notch parts disposed on opposing sides of the projection, and
the boot includes a pair of boot-side projections that engage with the notch parts.

3. The optical connector according to claim 1, wherein
the housing includes a pair of protrusions that protrude toward the rear side of the spring push,
the pair of protrusions is disposed outside of the projection of the spring push with respect to a longitudinal axis of the optical connector, and
a front edge part of the boot is disposed between the protrusions and the projection of the spring push.

\* \* \* \* \*